United States Patent [19]

Kolze et al.

[11] E Re. 30,207

[45] Reissued Feb. 5, 1980

[54] MEANS FOR CALIBRATING PRESSURE SWITCHES AT EXTRA-LOW PRESSURE SETTINGS

[75] Inventors: Lawrence A. Kolze, Bensenville; William H. Jones, Villa Park, both of Ill.

[73] Assignee: Eaton Corporation, Cleveland, Ohio

[21] Appl. No.: 916,992

[22] Filed: Jun. 19, 1978

Related U.S. Patent Documents

Reissue of:

[64] Patent No.: 3,846,600
Issued: Nov. 5, 1974
Appl. No.: 408,787
Filed: Oct. 23, 1973

U.S. Applications:

[63] Continuation of Ser. No. 737,293, Nov. 1, 1976.

[51] Int. Cl.[2] ..... H01H 35/34

[52] U.S. Cl. ..... 200/81 R; 200/83 S; 200/83 SA; 200/83 WM

[58] Field of Search ..... 200/83 P, 83 S, 83 SA, 200/83 WM, 153 L, 153 LA, 153 LB, 251, 286, 81 R

[56] References Cited

U.S. PATENT DOCUMENTS

| | | | |
|---|---|---|---|
| 2,375,387 | 5/1945 | Robbins | 200/83 SA |
| 2,919,321 | 12/1959 | Lung | 200/251 |
| 3,046,368 | 7/1962 | Kaminky | 200/83 P |
| 3,600,536 | 8/1971 | Kothe | 200/83 WM |
| 3,789,171 | 1/1974 | Kent | 200/83 S |
| 3,845,265 | 10/1974 | Kothe | 200/83 S |

*Primary Examiner*—Gerald P. Tolin
*Attorney, Agent, or Firm*—E. C. Crist; R. J. McCloskey; R. A. Johnston

[57] ABSTRACT

A simplified calibration mechanism is provided for a pressure switch using an adjustable, spring-biased plunger arrangement for controlling the trip force and hence the pressure to which the switch responds. The mechanism includes an especially configured lever pivoted at one end, contacting an especially shaped cam as a follower at its other end and the plunger at its mid portion. First calibration means are provided in the lever's pivoted end to adjust the normal low-high pressure settings of the switch. Second calibration means are provided to isolate the lever and cam from the plunger for effecting a precise setting of the pressure switch at extra-low pressures.

8 Claims, 4 Drawing Figures

Fig. 1
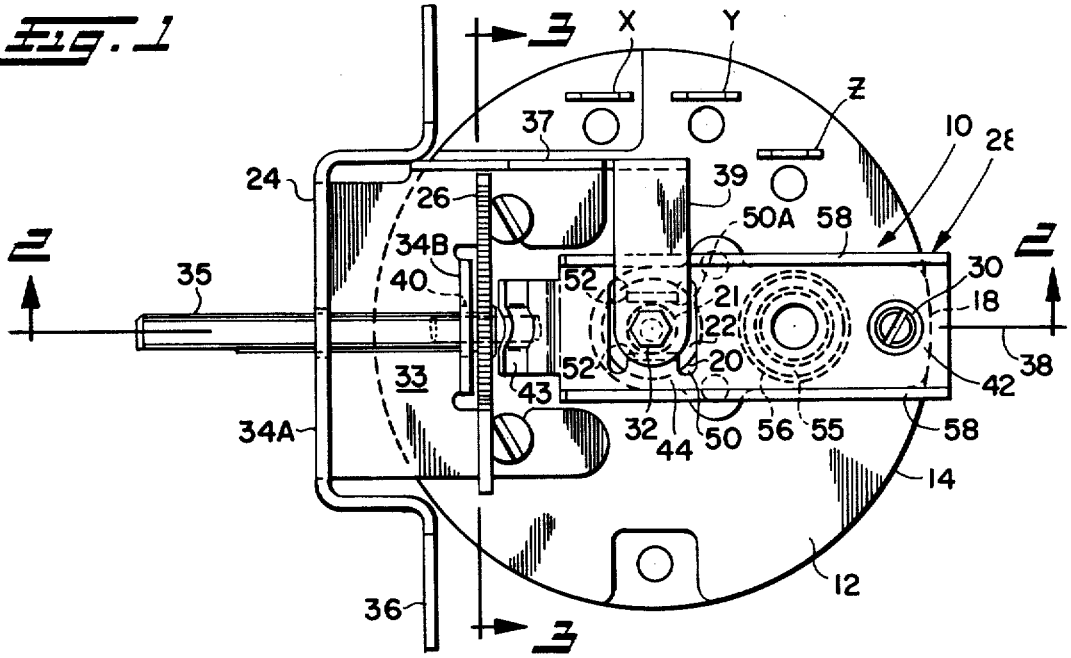
Fig. 2
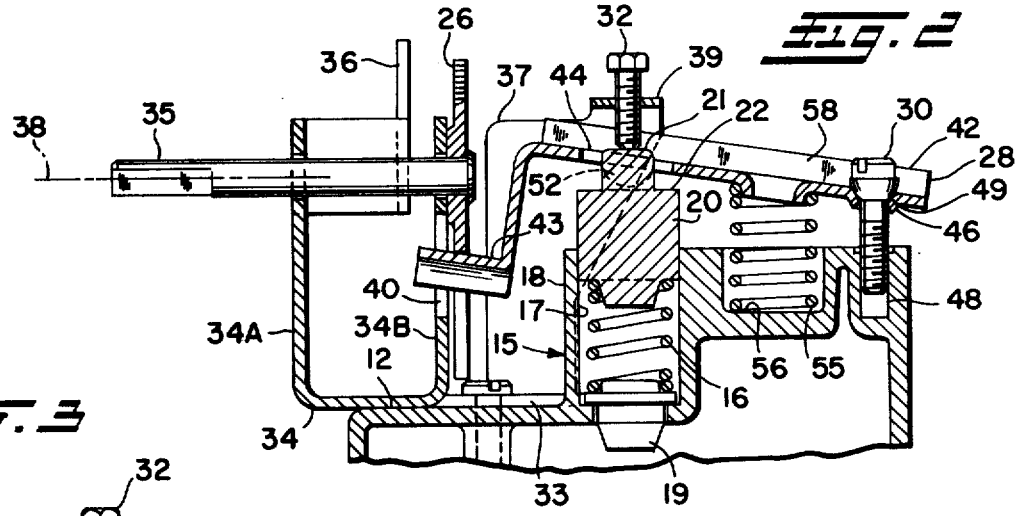
Fig. 3
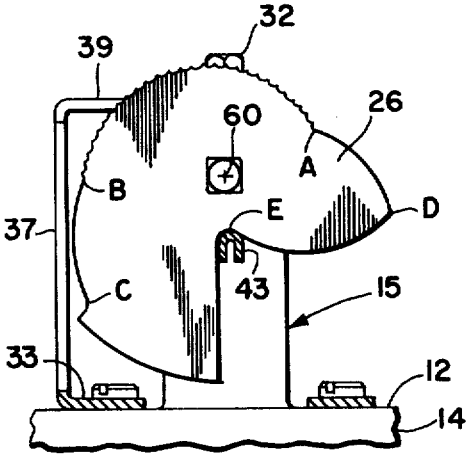
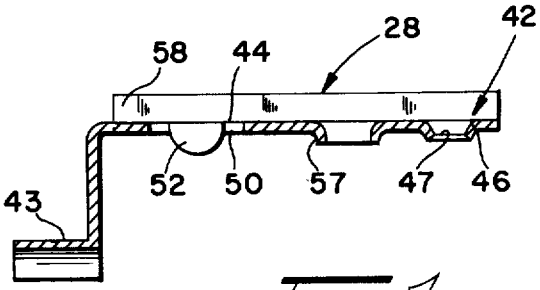
Fig. 4

MEANS FOR CALIBRATING PRESSURE SWITCHES AT EXTRA-LOW PRESSURE SETTINGS

Matter enclosed in heavy brackets [ ] appears in the original patent but forms no part of this reissue specification; matter printed in italics indicates the additions made by reissue.

*This is a continuation of application Ser. No. 737,293, filed Nov. 1, 1976, which is a reissue application of U.S. Pat. No. 3,846,600 which issued from Ser. No. 408,787.*

This invention relates generally to pressure switches and more particularly to a mechanism for calibrating same at two different pressure ranges.

The invention is particularly applicable to pressure switches used for controlling the water-fill level of washing machines, dishwashers and like domestic appliances, and will be described with particular reference thereto. However, it will be appreciated by those skilled in the art that the invention may have broader applications, and may be employed as a calibration mechanism for any type of control switch which must be actuated over a range of varying conditions sensed by the switch.

Heretofore pressure switches used in domestic appliances have commonly employed a cam associated with a lever-follower acting on the general plunger arrangement to establish various water levels between "high and low" pressure settings of the switch. Accordingly, means have been provided in such arrangements to calibrate the switches, usually at the high range end, at the factory. With the advent of "mini-wash" loads in such appliances, it became necessary to provide additional means to sense extra-low water levels (pressures). Additional structures had to be provided to calibrate such switches at this setting because the general cam arrangement was not sufficiently sensitive to such extra-low pressures. This has been accomplished by providing complex lever arrangements which rock about a first axis between "high and low" settings and about a second axis at the "extra-low" setting to null the cam arrangement. Such arrangements, however, do not isolate the lever-follower, and wear, slight calibration slip between high and low settings etc., adversely effects the delicate extra-low setting. Furthermore, additional mechanisms, such as a ratchet and pawl arrangement, had to be provided with the cam to prevent a "loose," water-fill operator knob at the appliance console. Finally, the general arrangement of such mechanism could easily result in the electrical leads connected to the switch terminals fouling the lever mechanism to hinder operation thereof or alternatively be shorted thereagainst.

It is thus a principal object of the subject invention to provide a calibration mechanism for a pressure switch which overcomes all of the above-noted disadvantages while being extremeley simple in design for ease in manufacture and assembly.

This object along with other features of the subject invention is achieved by an actuating mechanism provided for a pressure switch of the type using an adjustable spring-biased plunger arrangement for controlling the trip force and hence the pressure to which the switch responds. The calibration mechanism includes an especially configured lever pivoted in an adjustable manner at one end to the switch housing portion from which the plunger arrangement extends. The opposite lever end acts as a follower to engage a cam mounted on a bracket to the housing; the cam controlling normal "low-high" pressure settings of the switch. Accordingly calibration of the low-high settings is achieved by adjusting the space between the lever's pivoted end and the upper housing surface. To provide extra-low adjustment, a second calibration screw is provided in the cam bracket which limits the upward movement of the plunger arrangement and accordingly establishes the extra-low pressure setting. The cam is cut with a deep notch in the extra-low setting whereby the cam is rendered ineffective to exert a bias on the follower end of the lever.

In accordance with another feature of the subject invention, a spring is provided between the plunger portion and pivoted end of the lever arm which acts to bias the lever arm upwardly against the cam. The extra-low calibration screw is positioned over the plunger and adapted to pass through an especially configured slot in the lever arm adjacent the plunger. The lever arm is thus isolated from the plunger when the cam is moved into its extra-low setting because the spring biases the lever off the plunger while the extra-low calibration screw passes through the slot to contact the plunger and adjust the pressure accordingly.

In accordance with another feature of the subject invention, the spring biases the follower end of the lever into an especially configured slot formed in the cam at the extra-low pressure setting thereof. By locking the follower end of the lever into the slot, the operator control knob attached to the shaft of the cam remains in a "locked" position in proper alignment with its associated "water-fill" dial on the appliance console.

In accordance with yet another feature of the subject invention the bracket configuration and housing configuration is constructed to effectively surround the calibration mechanism and thus fully shield the field wiring from being caught therein. This permits the switch to be mounted in difficult locations on the console. Additionally the bracket may be universally applied to those switches not employing a mini-wash cycle and still shield the field wire from the rotating cam to prevent damage thereof.

It is thus another object of the subject invention to provide a calibration mechanism for a pressure switch wherein the extra-low pressure setting of the switch is achieved by isolating the calibration structure establishing "high-low" pressure settings from the "extra-low" calibration structure.

Another object of the subject invention in conjunction with the last mentioned object is to provide positive locking means for the calibration mechanism when the switch is placed in an "extra-low" pressure setting.

Still another object of the subject invention is to provide shielding means in the calibration mechanism of a pressure switch to prevent fouling and failing of the field wiring connected to the switch.

The invention may take physical form in certain parts and arrangement of parts, a preferred embodiment of which will be described in detail herein and illustrated in the accompanying drawings which form a part hereof and wherein:

FIG. 1 is a top plan view of the calibration mechanism of the subject invention;

FIG. 2 is a sectioned view of the calibration mechanism taken along line 2—2 of FIG. 1;

FIG. 3 is an end view of the calibration mechanism taken along line 3—3 of FIG. 1 to show the cam profile; and FIG. 4 is a longitudinally sectioned view of the actuating lever employed in the calibration mechanism.

Referring now to the drawings wherein the showings are for the purpose of illustrating a preferred embodiment of the invention only and not for the purpose of limiting same, there is shown in FIG. 1 a calibration mechanism 10 mounted onto a generally flat housing surface 12 of a pressure switch 14.

Because pressure switch 14, by itself, does not form an essential feature of the subject invention and since its construction is known to those skilled in the art, the details of the switch are not shown herein. It is important only to understand that an adjustable spring-biased plunger arrangement 15 controls the trip force and hence the pressure to which switch 14 responds. One such plunger arrangement is shown in FIG. 2 and includes a first spring 16 received within a bore 17 formed in a boss 18 extending from the generally flat housing portion surface 12. The bottom end of first spring 16 acts against a switch blade (not shown) usually by means of an actuator 19 to normally bias the switch blade into a first snapped position. The precompression force of spring 16 and thus the switch trip pressure is calibrated by the distance a plunger 20 extends within bore 17 to compress the spring. Opposing the spring force is pressure, determined by the water level in the tub, as sensed by a diaphragm (not shown) which exerts a force on the opposite side of the switch blade. As the water-fill level increases, the diaphragm force becomes large enough to overcome the spring precompression and slight movement of the diaphragm thereafter moves the switch blade toggle mechanism pass center to snap the switch.

The calibration mechanism 10 of the subject invention as best shown in FIGS. 1 and 2 includes an especially configured mounting bracket 24 housing and journalling a cam 26 therein; a lever 28 operatively associated with cam 26; a primary calibration screw 30 for adjusting normal "low-high" pressure settings and a secondary calibration screw 32 for adjusting an "extra-low" pressure setting.

Mounting bracket 24 has a generally flat base 33 secured to housing surface 12 by a pair of screws. Extending upwardly from base 33 is a known U-shaped bracket portion 34 for journalling the shaft 35 of cam 26 as best shown in FIG. 2. The forward leg 34A of the U-shaped bracket portion at the upper end thereof is formed into a stepped flange 36 for mounting pressure switch 14 to the console of an appliance. Longitudinally extending at one side of mounting bracket 24 is a vertical wall portion 37 which is parallel to the longitudinal centerline 38 of shaft 35 and lever 28. Vertical wall portion 37 is postioned on the side of housing surface 12 which contains known terminal connections X, Y, and Z for completing appropriate circuitry when the switch is snapped. Importantly wall portion 37 is spaced from centerline 38 a distance approximately equal to the maximum diameter of cam 26. At the upperpart of the rearward end of vertical wall portion 37 there is provided a right angled tab portion 39 which receives in threaded engagement therethrough the secondary calibration screw 32.

The lever 28 of calibration mechanism 10 is shown in FIGS. 1, 2 and 4 and may best be defined as having a pivoted end portion 42, a follower end portion 43 at the opposite end of the lever and a mid portion 44 adapted to contact plunger 20.

Follower end portion 43 is formed in a known circular configuration to insure proper contact with the profile of cam 26 and extends through an opening 40 in the rear leg 34B of U-shaped bracket portion 34. Opening 40 is sufficiently sized to permit unimpeded vertical travel of the follower end which occurs upon rotation of cam 26.

Pivoted end portion 42 as best shown in FIG. 2 may be defined by a spherical follicle 46 having a central opening 47 extending therethrough. Follicle 46 is adapted to receive in a pivotable manner the spherical head 49 of the first calibration screw 30 which in turn is self-threaded into a bore 48 formed in the especially configured boss 18 in housing surface 12.

Mid portion 44 includes an especially configured H-slot 50 (FIG. 1), the longitudinally oriented portion theref 50A having sufficient width to receive a boss 21 (FIG. 2) extending from the top end 22 of plunger 20 which is especially configured in this respect. Formed on the bottom of lever 28 and on each side of the longitudinally extending portion of H-slot 50 is an arcuate projection 52 (FIG. 4) which is adapted to engage the top surface 22 of plunger 20 on opposite sides of boss 21. Arcuate projections 52 have a depth less than the height of boss 21 to insure that the boss will always extend through H-slot 50 and thus prevent interference therebetween.

Between pivot end 42 and mid portion 44 of lever 28 is a second spring 55. Spring 55 is seated at one end in a second bore 56 formed in housing boss 18 and at its other end is seated on lever 28 by a boss 57 which is formed in the underside surface of the lever by punching a hole therethrough. The main body portion of the lever is strengthened by side rails 58 which impart "channel-like" structural properties to the lever.

The cam profile which is engaged by the follower end 43 of lever 28 is shown in FIG. 3. That portion of the cam profile between Points A and B controls the normal "low-high" settings of the pressure switch which typically occur between pressure ranges from 8 to 16 inches of water. The cam profile between Points A and B is shown serrated to provide an "infinite" water level adjustment between the normal low and high ranges of the switch. Positive, mechanical reset of the switch occurs when the cam is further rotated over its smooth portion between Points B and C of the cam profile. The cam profile between Points B and C is a generated curve having greatest radial distance at its stop defined by Point C to assure return of the cam to its maximum high setting level and thus prevent locking of the switch at reset.

When cam 26 is rotated in its opposite direction the follower end 43 will eventually rest at Point E of the cam profile defined as the "mini-wash" or "extra-low" pressure setting. To insure positive reset of the switch as cam 26 is rotated to its "mini-wash" position, the cam is cut with a lobe indicated at Point D which has a radial distance extending to the cam enter 60 approximately equal to the mid point radial distance of the cam profile between Points B and C.

When the device is assembled at the factory, cam 26 is usually rotated to Point B on its profile, the highest pressure setting in the normal "low-high" range. First calibration screw 30 is turned to adjust the position of lever 28 for proper setting of the high pressure thereby establishing the normal "low-high" range. When cam 26 is rotated within its normal "low-high" range and also through its positive reset position i.e., Points A–C, the arcuate projections 52 contact the top end 22 of plunger 20 to accordingly adjust the precompression of first spring 16 or to establish a solid driving connection to assure positive mechanical reset.

The cam is then rotated into its "extra-low" or "mini-wash" pressure setting at Point E. In this cam position, second spring 55 lifts lever projections 52 off the top end 22 of the plunger while forcing the follower end 43 into the cam notch defined at Point E. The secondary calibration screw 32 is then self-threaded through an opening in tab portion 39 of mounting bracket to contact the boss end 21 of plunger 20. Thus, second spring 55 which assures good contact between lever end 43 and the cam profile during normal "low-high" pressure range settings also functions in the "extra-low" setting to not only isolate the cam 26 but also the lever 28 from adversely effecting the "extra-low" pressure setting. Extra-low pressure settings between 3.7 and 5.3 inches $H_2O$ can be achieved within close tolerance ranges by thus isolating the "low-high" calibration mechanism from the "extra-low" calibration structure. Thus the design of first spring 16 which must be responsive to a wide range of pressure settings need only be designed to such pressures since second spring 55 provides the force necessary to maintain the calibration mechanism in "sync." Additionally, the design of second spring 55 is not critical in the sense that same effects the calibration of the switch and thus externally exposing second spring 55 is not harmful to the operation thereof.

Furthermore the use of second spring 55 permits the switch to be locked in its "extra-low position" in an aligned manner. That is the profile of cam 26 at Point E can be shaped to conform generally to the shape of the follower end 43 of lever 28. Thus cam 26 is in a "locked" position relative to lever 28 and the appliance control knob (not shown) mounted on camshaft 35 is likewise "locked" to assure alignment with its corresponding console dial (also not shown) for properly indicating the "mini-wash" setting.

To reduce the possibility of calibration slip during repeated usage of the pressure switch, both calibration screws 30, 32 are self-threaded into their respective bores and a sealing substance such as "glyptal" is applied to the threads of the screws to further reduce the possibility of loosening during use. Furthermore, because both calibration screws are threaded into fixed surfaces (first calibration screw 30 into housing surface 12 and secondary calibration screw 32 into bracket tab portion 39) any tool forces applied to either calibration screw cannot adversely influence the force on first spring 16. This permits quick calibration of the switch during assembly.

Furthermore, mounting of the switch into the appliance is simplified by the shroud mechanism built into the switch housing. That is, vertical wall portion 37 of mounting bracket 24 prevents field wires (not shown) connected to terminals X, Y, Z from becoming fouled in the cam mechanism and the boss configuration 18 formed in the housing surface portion 12 prevents fouling of the field wires with the lever mechanism. In this manner the possibility of the field wiring hindering the operation of the calibration mechanism and/or being shorted thereagainst is remote. Thus the need for wiring harnesses to be applied in the field to prevent wire fouling is eliminated.

While the cam and bracket arrangement of the subject invention can be constructed of metal parts, the cam 36, camshaft 35 and lever 28 are preferably formed of plastic such as polypropylene which has a low coefficient of friction. The use of such plastic not only substantially reduces the cost of the assembly, but also eliminates the need for lubricating or greasing these parts if made from metal. This simplifies the assembly of the device and also prevents foreign matter from accumulating in the grease during use of the switch which, in time, may hinder switch operation.

The invention has been described with reference to a preferred embodiment. Obviously, modifications and alterations will occur to others, upon reading and understanding the specification. For example, slot 50 could be eliminated and the extra-low setting be achieved by adjusting screw 32 to contact bracket 28 which inturn would contact plunger 20. Such modification would have to incorporate additional known structure to "lock" cam 26 relative lever 28 in the "extra-low" setting. It is our intention to include all such modifications and alterations insofar as they come within the scope of the present invention.

It is thus the essence of the invention to provide in a pressure switch simplified calibration means therefor which permit the switch to be adjusted over two pressure ranges with the mechanism employed in effecting one of the pressure ranges being isolated from adversely effecting the mechanism establishing the second pressure range and vice versa.

What I claim is:

[1. A calibration mechanism for a pressure switch of the type having a spring-biased plunger arrangement adjustable to sense different pressures to which said switch responds, said mechanism comprising:

means for establishing and calibrating normal "low to high" pressure settings of said switch, said "low to high" pressure setting means including lever means for adjusting said plunger and cam means operatively associated with said lever means to provide a "low to high" range of settings; and means for establishing and calibrating an "extra-low" pressure setting for said switch, said "extra-low" pressure setting means effective to isolate said lever and said cam means from acting on said plunger when said "extra-low" pressure setting means is operative.]

[2. The calibration mechanism of claim 1 wherein said lever means includes a lever pivotable at one end to said switch, engaging said cam means at its opposite end as a follower and contacting said plunger about a portion between its ends, said pivotable lever end defined by a follicle therein having a central opening extending through said follicle and a fastener received in threaded engagement with the switch housing and having a head received in said follicle whereby said switch can be calibrated between said low-high pressure settings.]

[3. The calibration mechanism of claim 2 wherein said "extra-low" pressure setting means includes an opening extending through said portion of said lever, adjustable stop means suspended above said opening for contacting said plunger, spring means between said lever and the switch housing and longitudinally positioned between said lever portion and said pivotable end for biasing said lever against said cam means and notch means within said cam means for receiving said cam follower end of said lever to raise said lever from contact with said plunger.]

[4. The calibration mechanism of claim 3 wherein said lever and said cam means are formed of plastic having a low co-efficient of friction.]

[5. The calibration mechanism of claim 3 wherein said plunger arrangement includes said plunger partially received within a bore in the switch housing, said plunger having an exposed top end and a boss extending said top end, said boss extending through said opening in said lever, and said portion of said lever having a pair of arcuate projections extending from the underside surface thereof and spaced on diametrically opposite sides of said opening, said projections straddling said boss of said plunger and contacting said top surface of said plunger when said "low to high" pressure setting means are operable.]

[6. The calibration mechanism of claim 3 wherein said cam means includes a rotatable cam having a first stepped profile receiving said follower end of said lever for establishing said "low to high" range and a second stepped profile for establishing said "extra-low" setting, and said notch means including a notch in said second profile, said notch configured similar to said follower end of said lever for relatively locking said cam and said lever in said extra-low range.]

[7. The calibration mechanism of claim 6 wherein said extra-low setting is within the range of 3.7 to 5.3 in $H_2O$ pressure.]

[8. In a pressure switch of the type having a plunger arrangement at least partially disposed within a bore formed in a portion of the switch housing and biased by a first spring, the effective force of which determines the pressure at which said switch responds, the improvement comprising:

bracket means mounted on said pressure switch housing portion in which said plunger arrangement is formed;

lever means pinned to said housing portion at one end thereof and acting on the plunger to adjust said pressure switch;

cam means mounted on said bracket means and acting on said lever means opposite said pinned end to bias said lever means in opposition to said first spring force of said pressure switch over a "low to high" range of settings and movable to an "extra-low" position;

first calibrating means at said pinned end of lever means to determine the maximum high setting of said device; and second calibrating means mounted on said bracket means for calibrating said switch to said "extra-low" setting and rendering said cam means ineffective to bias said lever means in opposition to said spring force in said "extra-low" position.]

[9. The pressure switch of claim 8 wherein said lever means is defined by a generally channelled shaped lever arm having a follicle at one end with an opening extending therethrough, and said first calibrating means including a fastener received in threaded engagement with said first housing portion, said fastener having a head received within said follicle.]

[10. The pressure switch of claim 9 wherein a second spring is compressed between said first housing portion and said lever to exert a bias on said lever in the same direction as said first spring, and said second calibrating means further provides means for rendering ineffective the bearing of said lever on said plunger.]

[11. The pressure switch of claim 10 wherein said second calibrating means further includes said cam means relatively locking said lever therewith when said switch is in said extra-low setting.]

[12. In a pressure switch of the type having a generally flat housing surface, said housing having a bore therein, an adjustable, spring-biased plunger extending partially within said bore for establishing the effective force which determines the pressure at which said switch responds, calibration means for adjusting the position of said plunger, and electrical terminals on one side of the longitudinal centerline of said housing for receiving field wires to complete switch circuitry, the improvement comprising:

a bracket having a base mounted to said generally flat surface;

a U-shaped bracket portion extending upwardly from said base;

a shaft journalled within said U-shaped bracket portion and a cam secured to said shaft, said cam defining a part of said calibration means;

an upwardly extending, sidewall portion of said bracket extending generally parallel to said longitudinal centerline and spaced from said shaft a distance approximately equal to the maximum radius of said cam for preventing fouling of said field wires with said cam.]

[13. The pressure switch of claim 12 wherein said housing surface includes an upwardly extending, raised boss portion having first, second, and third bores longitudinally spaced bores formed therein, said plunger extending partially within said bore, said calibration mechanism including a lever having one end engaging said cam, its opposite end pivotable about a fastener, extending therethrough, and a mid-portion thereof adapted to contact said plunger, said fastener received within said second bore, and a spring received partially within said third bore spaced between said first and second bores and compressed against the underside of said lever whereby said raised portion of said housing prevents fouling of said field wires within the lever mechanism.]

*14. A calibration mechanism in a pressure switch of the type having a spring-biased plunger arrangement adjustable to sense different pressures to which said pressure switch responds, said mechanism comprising:*

*(a) means for establishing and calibrating normal "low to high" pressure settings of said pressure switch, said "low to high" pressure setting means including lever means for adjusting said plunger and selectively operative cam means in association with said lever means to provide a "low to high" range of settings, wherein said lever means includes a lever adapted for pivotal movement at only one end thereof with respect to said pressure switch, said lever having the opposite end thereof engaging said cam means, as a follower with portions thereof intermediate said ends contacting said plunger;*

*(b) means biasing said lever in a direction for engaging said cam means;*

*(c) means pivotally mounting said one lever end to said pressure switch, said pivot means including adjustable means operable, upon adjustment, to move the fulcrum of said lever with respect to said plunger for varying the spring biasing of said plunger; and*

*(d) wherein said biasing means acts on said lever intermediate said pivot means and said cam follower and wherein said cam follower, said biasing means and said pivot means are disposed in straight line relationship throughout the range of movement of said lever.*

*15. The calibration mechanism of claim 14, further including:*

*(a) means for establishing and calibrating an "exta-low" pressure setting for said pressure switch, said "extra-low" pressure setting means including*

*(i) an opening extending through said lever;*

*(ii) adjustable stop means suspended above said opening for contacting said plunger, said "extra-low" pressure setting means effective while said cam means is positioned in said "extra-low" position for directly engaging and limiting the position of said spring biased plunger such that said lever is disengaged from said plunger;*

*(b) said biasing means includes spring means disposed between said lever and said switch and located longitudinally along said lever between said opening and said pivotable end for biasing said lever against said cam means; and*

*(c) latch means within said cam means for receiving said follower end of said lever to raise said lever from contact with said plunger.*

*16. The calibration mechanism defined in claim 14, wherein,*

*(a) said adjustable means includes fastener means received through said lever and adjustably engaging said switch, said fastener means including means defining a first surface; and*

*(b) said lever defining a second surface adjacent said one lever end, said biasing means being effective for maintaining said first and second surfaces in self-aligned contact for defining the fulcrum of said lever.*

*17. The calibration mechanism defined in claim 14, wherein,*

*said cam means includes notch means operative when said cam means is selectively moved to certain positions to cause said lever to operatively move said plunger.*

*18. The calibration mechanism defined in claim 14, wherein said cam means includes a rotatable cam having a stepped profile with said follower end of said lever received thereon for establishing said low-to-high range of pressure settings.*

*19. A calibration mechanism in a pressure switch of the type having a spring-biased plunger arrangement adjustable to sense different pressures to which said pressure switch responds, said mechanism comprising:*

*(a) means for establishing and calibrating normal "low to high" pressure settings of said pressure switch, said "low to high" pressure setting means including lever means for adjusting said plunger and selectively operative cam means in association with said lever means to provide a "low to high" range of settings, wherein said lever means includes a lever adapted for pivotal movement at one end thereof with respect to said pressure switch, said lever having the opposite end thereof engaging said cam as a follower, with portions thereof intermediate said ends contacting said plunger;*

*(b) means biasing said lever in a direction for engaging said cam means;*

*(c) means pivotally mounting said one lever end to said pressure switch, said pivot means including adjustable means operable, upon adjustment, to move the fulcrum of said lever with respect to said plunger for varying the spring biasing of said plunger; and*

*(d) means for establishing and calibrating an "extra-low" pressure setting for said pressure switch, said "extra-low" pressure setting means including*

*(i) an opening extending through said lever;*

*(ii) adjustable stop means suspended above said opening for contacting said plunger, said extra-low pressure setting means effective while said cam means is positioned in said "extra-low" position for directly engaging and limiting the position of said spring biased plunger such that said lever is disengaged from said plunger;*

*(e) said biasing means includes spring means disposed between said lever and said switch and located longitudinally along said lever between said opening and said pivotable end for biasing said lever against said cam means; and*

*(f) latch means within said cam means for receiving said follower end of said lever to raise said lever from contact with said plunger.*

*20. A calibration mechanism in a pressure switch of the type having a spring-biased plunger arrangement mounted in a housing, said spring biased plunger arrangement adjustable to sense different pressure to which said switch responds, said mechanism comprising:*

*(a) said plunger arrangement includes said plunger partially received within a bore in said housing, said plunger having an exposed top end and a boss extending said top end, said boss extending through an opening in said lever,*

*(b) means for establishing and calibrating normal "low to high" pressure settings of said pressure switch, said "low to high" pressure setting means including lever means for adjusting said plunger and selectively operative cam means in association with said lever means to provide a "low to high" range of settings, wherein said lever means includes a lever adapted for pivotal movement at one end thereof with respect to said pressure switch, said lever having the opposite end thereof engaging said cam as a follower, said lever having a pair of spaced projections extending from the underside surface thereof and adjacent said opening, with said boss of said plunger slidably received therebetween and guided thereby, said projections contacting said top surface over said "low to high" range pressure setting;*

*(c) means biasing said lever in a direction for engaging said cam means;*

*(d) means pivotally mounting said one lever end to said pressure switch, said pivot means including adjustable means operable upon adjustment, to move the fulcrum of said lever with respect to said plunger for varying the spring biasing of said plunger; and*

*(e) means for establishing and calibrating an "extra-low" pressure setting for said pressure switch, said "extra-low" pressure setting means effective while said cam means is positioned in said "extra-low" position for directly engaging and limiting the position of said spring biased plunger such that said lever is disengaged from said plunger, thereby isolating and disen-*

*gaging said cam means and said lever from said plunger during said "extra-low" setting.*

*21. A calibration mechanism in a pressure switch of the type having a spring-biased plunger arrangement adjustable to sense different pressures to which said switch responds, said mechanism comprising:*

*(a) means for establishing and calibrating normal "low to high" pressure settings of said switch, said "low to high" pressure setting means including lever means for adjusting said plunger and selectively operative cam means in association with said lever means to provide a "low to high" range of settings, wherein said lever means includes a lever adapted for pivotal movement at only one end thereof with respect to said switch, said lever having the opposite end thereof engaging said cam means as a follower with portions thereof intermediate said ends contacting said plunger;*

*(b) means biasing said lever in a direction for engaging said cam means;*

*(c) means pivotally mounting said one lever end to said switch, said pivot means including adjustable means operable, upon adjustment, to move the fulcrum of said lever with respect to said plunger for varying the spring biasing of said plunger, said adjustable means includes fastener means received through said lever and adjustably engaging said switch, said fastener means including means defining a first surface; and*

*(d) said lever defining a second surface adjacant said one lever end, said biasing means being effective for maintaining said first and second surfaces in self-aligned contact for defining the fulcrum of said lever; and*

*(e) wherein said biasing means acts on said lever intermediate said pivot means and said cam follower.*

* * * * *